United States Patent [19]

Fäsi et al.

[11] Patent Number: 5,151,503
[45] Date of Patent: Sep. 29, 1992

[54] PROCESS FOR REDUCING HYDROLYSED PROTEIN CHLOROHYDRIN CONTENT

[75] Inventors: Roland Fäsi, Bruetten, Switzerland; Milo A. Nielsen, Granada Hills, Calif.

[73] Assignee: Nestec S.A., Vevey, Switzerland

[21] Appl. No.: 676,899

[22] Filed: Mar. 28, 1991

[51] Int. Cl.⁵ .......................... C07K 3/12; C07K 3/28
[52] U.S. Cl. .................... 530/412; 530/370; 530/372; 530/407; 530/427; 210/774; 210/808
[58] Field of Search ............ 530/407, 412, 420, 423; 210/749, 767, 774, 808

[56] References Cited

U.S. PATENT DOCUMENTS

| | | | |
|---|---|---|---|
| 1,035,591 | 8/1912 | Ikeda et al. | 530/407 |
| 2,538,898 | 1/1951 | Cleland et al. | 260/112 |
| 2,991,309 | 7/1961 | Hoglan et al. | 260/529 |
| 3,118,815 | 1/1964 | Li | 167/74 |
| 3,391,001 | 7/1968 | Sair | 99/17 |
| 4,759,944 | 7/1988 | Fäsi et al. | 426/650 |
| 5,102,987 | 1/1992 | Cornet et al. | 530/343 |

FOREIGN PATENT DOCUMENTS 363771  4/1990  European Pat. Off. .

OTHER PUBLICATIONS

Velisek, et al. "Chlorohydrins in Protein Hydrolysates". Z. Lebensm. Unters. Forsch. 167: 241–244 (1978).

Primary Examiner—Merrell C. Cashion, Jr.
Assistant Examiner—Andrew G. Rozycki
Attorney, Agent, or Firm—Vogt & O'Donnell

[57] ABSTRACT

The chlorohydrin content of a liquid containing hydrolyzed protein obtained by hydrolysis of protein with hydrochloric acid is reduced in an apparatus system by introducing alkali into the liquid flowing under pressure in a piping system to increase the pH of the liquid, after which the pH-increased flowing liquid is heated, and then the heated flowing liquid is held for a time sufficient in a holding piping section to reduce the chlorohydrin content of the hydrolyzed protein contained in the liquid. The flowing liquid under pressure then is cooled before or after addition of hydrochloric acid which is employed to adjust the pH of the liquid.

12 Claims, 2 Drawing Sheets

PROCESS FOR REDUCING HYDROLYSED PROTEIN CHLOROHYDRIN CONTENT

BACKGROUND OF THE INVENTION

The present invention relates to reduction of the chlorohydrin content of a product obtained from protein hydrolysed with hydrochloric acid.

As is known, hydrolysing protein with hydrochloric acid leads to formation of certain undesirable chlorinated by-products which have come to be known generically and commonly as chlorohydrins, or α-chlorohydrins, which include mono-chloropropandiol, i.e., 3-chloro-propan-1,2-diol, and di-chloropropanol, i.e., 1,3 dichloropropan-2-ol, compositions. Desirably, it is sought to provide hydrolysed protein obtained by hydrolysis of protein with hydrochloric acid which contains chlorohydrins in an amount of below 1 ppm.

Various means and methods have been proposed and employed to reduce the chlorohydrin content of protein hydrolysed with hydrochloric acid, including subjecting a liquid containing the hydrolysed protein to a steam distillation process, as disclosed in U.S. Pat. No. 4,759,944. It also is known that the chlorohydrin content may be reduced by adjusting the pH of the hydrolysed protein, which is acidic, with an aqueous alkali composition to a pH of from about 8 to about 14 and holding the pH-adjusted hydrolysed protein for a time sufficient to reduce the chlorohydrin content, as described in European Patent Application No. 88118189.3 and its counterpart U.S. application Ser. No. 07/258,191.

It has been known to us that the alkaline treatment process disclosed in the above-noted European and U.S. applications can be carried out readily in bulk in a batch-wise process. However, it was found that, particularly at chlorohydrin reduction reaction temperatures of from about 35° C. to 55° C., as exemplified in the European and U.S. applications, holding the quantities of hydrolysate produced by commercial scale hydrolysis equipment in bulk batches results in holding times on the order of hours and requires what may be considered to be uneconomical amounts of facility workspace to match production efficiency of the hydrolysate production step.

To address the problem, it was sought further to employ the knowledge disclosed in the European and U.S. applications that as the temperature of the chlorohydrin reduction reaction is increased above ambient conditions, the reaction induced by the added alkali requires less time to achieve an equivalent amount of chlorohydrin reduction. However, it was found that chlorohydrin reduction reaction temperatures of from about 70° C. to 80° C. still required holding times on the order of hours and that as reaction temperatures approach 100° C., quantities of ammonia gas are produced which, as a practical matter, must be removed from the workplace. As is apparent, collection and disposal of the ammonia gas requires additional methods and means.

Thus, our efforts have been directed to increase the efficiency of reduction of the chlorohydrin content of hydrochloric acid-produced hydrolysed protein in a commercial environment on a scale which is compatible with the production efficiency of generally available hydrolysis means and methods and to address the problem of production of ammonia gas in an alkaline chlorohydrin reduction reaction.

SUMMARY OF THE INVENTION

It has been discovered that, by means and methods of the present invention, the chlorohydrin content of hydrolysed protein obtained by hydrolysis of protein with hydrochloric acid may be reduced by a continuous process which enables suppression and substantial avoidance of ammonia gas from the processed hydrolysed protein and that production capacity of the process and equipment to achieve chlorohydrin content reduction may be made compatible with that of known commercial operations employed for preparing the hydrolysed protein without occupying undue facility workspace.

The process of the present invention is broadly characterized in that the chlorohydrin content of a liquid comprising hydrolysed protein obtained from the hydrolysis of protein with hydrochloric acid is reduced by introducing and mixing an alkali into the liquid in an amount sufficient to increase the pH of the liquid and then holding the pH-increased liquid under conditions of time and temperature sufficient for the alkali to react with chlorohydrin compositions contained in the liquid to reduce the chlorohydrin content of the hydrolysed protein contained in the liquid.

The process of the present invention is more particularly characterized in that a quantity of alkali is introduced into and mixed with a flowing liquid under a pressure greater than atmospheric pressure, wherein the liquid comprises hydrolysed protein obtained by hydrolysis of protein with hydrochloric acid, in an amount sufficient to increase the pH of the liquid, in that the flowing pH-increased liquid under pressure is heated to a temperature of from about 100° C. to about 170° C., and then, in that the temperature of the flowing heated liquid is maintained under pressure at the temperature of from about 100° C. to about 170° C. for a time sufficient for reducing the chlorohydrin content of the hydrolysed protein contained in the liquid and then, in that the chlorohydrin-reduced liquid under pressure is cooled to a temperature below 100° C. and the pressure is released.

The cooled liquid subsequently may be acidified with hydrochloric acid and equilibrated, and then, if desired, dehydrated, or otherwise collected and be employed for uses conventional in the art.

To maintain the temperature of the heated liquid for a time sufficient to reduce the chlorohydrin content of the liquid, the flowing heated liquid is passed to and through a holding piping section means of an apparatus system which maintains the temperature of the heated liquid flow at the temperature of from 100° C. to 170° C. and which has a volume sufficient, with respect to a rate of flow of the heated liquid, to hold the heated liquid for a residence, or dwell, time sufficient for reducing the chlorohydrin content of the hydrolysed protein contained in the liquid.

The present invention is characterized further, alternatively, in that a quantity of hydrochloric acid is introduced and mixed into the cooled liquid under pressure to adjust the pH of the cooled liquid and then the pressure is released from pH-adjusted cooled liquid or it may further be cooled, preferably by such as flash-cooling. As above, the treated liquid may be equilibrated and, if desired, dehydrated or otherwise collected for use.

The present invention is characterized still further, alternatively, in that a quantity of hydrochloric acid is introduced into and mixed with the flowing heated liquid passed from the holding piping section of the system to adjust the pH of the liquid after which the pH-adjusted liquid is cooled and the pressure is released, preferably by flash-cooling which simultaneously relieves the pressure. The cooled liquid then may be equilibrated, and then if desired, dehydrated, or otherwise collected and subsequently employed in conventional uses in the art.

The process of the present invention may be employed and practiced with a liquid obtained directly from the hydrolysis reaction and thus may contain residual unhydrolysed material, or the liquid may be filtered or otherwise treated to remove residual material.

Since the liquid obtained from hydrochloric acid hydrolysis of protein generally has a pH of below a pH of about 5, to effect the chlorohydrin reduction reaction, alkali is added to increase the pH of the liquid to a pH of at least about 5 and may be added to increase the pH to a pH as high as about 14.

Generally, and particularly when the alkali addition has increased the pH of the liquid to a pH of above about 6–7, hydrochloric acid is added to the chlorohydrin content-reduced liquid such that the liquid is adjusted to a pH of from about 4 to about 7, and generally, to a pH of from about 4 to about 5.5, after which the product may be equilibrated which may include adjusting the pH with a buffer to a pH of from about 5 to about 5.2.

The present invention also provides an apparatus system for performing the process disclosed herein characterized in that system piping means is provided for containing flowing liquid containing hydrolysed protein under pressure which includes an intermediate positioned holding piping section means having a volume sufficient, with respect to a rate of flow of liquid in the holding piping section means, to contain the flowing liquid for a predetermined residence, or dwell, time in the holding piping section means at a predetermined temperature, and in that positioned upstream of the holding piping section means and connected with the system piping means are means for introducing an alkali into liquid flowing under pressure in the system piping means, means for mixing the alkali with the liquid and means for heating the liquid mixed with the alkali, and in that positioned downstream of the holding piping section means and connected with the system piping means are means for cooling the flowing heated liquid under pressure and means for releasing the pressure. Means are also provided for collecting and/or further treating the cooled product.

The apparatus system of the present invention, alternatively, is characterized further in that positioned downstream of the holding piping section means and connected to the system piping means are means for introducing and means for mixing hydrochloric acid into the liquid flowing in the system piping means. The means for introducing and for mixing the hydrochloric acid may be positioned upstream or downstream of the means for cooling the liquid. Particularly, in the case where hydrochloric acid has been introduced prior to cooling the liquid, the means for cooling and releasing the pressure is provided by means for flash-cooling. Means again are provided for collecting or further treating the treated product.

DETAILED DESCRIPTION OF THE INVENTION

For practice of the present invention, plant or animal protein, which may be derived from various origins such as corn, soy, wheat, rice, yeast, peanut, or casein, for example, may be hydrolysed, as is known to those skilled in the art. The protein may be obtained, for example, by separation of a protein fraction during milling of grains or may be obtained following solvent extraction of oils from a proteinaceous material or by other methods known in the art. The amount of protein material employed in the hydrolysis reaction with hydrochloric acid in the reaction mixture may vary widely, for instance from about 30% to about 50% by weight, but more usually from 38% to 42% by weight, the protein weight being based on the total weight of hydrolysis reaction mixture.

Although the hydrochloric acid employed in the hydrolysis reaction mixture may be concentrated, i.e., about 32%, by weight, i.e., about 10 M, it preferably is employed in the hydrolysis reaction at a concentration of from about 15% to about 25% by weight, and most preferably is from about 17% to about 19% by weight, the weight being based upon the total weight of an aqueous solution of hydrochloric acid.

The hydrolysis reaction may be performed at a temperature of from about 70° C. to about 140° C. and most preferably at a temperature from about 110° C. to about 115° C.

The duration of the hydrolysis reaction may vary from about 2 hours to about 12 hours and most preferably is from about 3 hours to about 5 hours, and generally, for any desired degree of hydrolysis, longer periods of time are required at lower temperatures.

It generally has been found that performing the hydrolysis reaction under conditions wherein the acid concentration is about 18%, wherein the temperature is about 110° C. to about 115° C. and wherein the duration of hydrolysis is from about 3 to about 4 hours, or when a combination of at least two of these processing parameters are employed, desirable production capacity is achieved while, on a relative basis, the amount of undesirable chlorinated compounds, i.e., chlorohydrins, formed during the hydrolysis is minimized, as compared with operating under other conditions mentioned above.

The hydrolysis reaction may be carried out with stirring or other agitation and, if desired, may be carried out under elevated pressure, for instance up to 0.7 MPa (100 psig), and more usually from 0.07 MPa to 0.35 MPa (10 psig to 50 psig).

After hydrolysis, the liquid containing the hydrolysed protein may, if desired, be filtered to filter off residual unhydrolysed material. However, whether the liquid is filtered or not, in accordance with the present invention, a flow of the liquid containing the hydrolysed protein is introduced into system piping means and passed through the system piping means under pressure. The pressure employed to direct the flow downstream through the system piping means, which may be effected readily by such as pumps, is generally from about 1 bar to 2 bars higher than a pressure generated by temperatures employed in the apparatus system and method to effect the chlorohydrin reduction reaction. Although various pump means may be employed, volumetric feeding or centrifugal pumps are preferred.

A food-acceptable alkali such as KOH or NH$_4$OH, but preferably NaOH and/or Na$_2$CO$_3$ is introduced into and mixed with the flow of the liquid in an amount sufficient to increase the pH of the liquid. Although the alkali may be introduced in a solid form, such as a powder, it is introduced most readily as an aqueous solution which is preferably as concentrated as possible. Thus, the aqueous alkali preferably has a concentration of approximately 50% alkali by weight, i.e., about 19 M. Pump means such as centrifugal, gear dosing or volumetric, or membrane dosing pumps may be employed to introduce the alkali and generate pressure upon the alkali for efficient introduction of the alkali into the flow of the liquid. A gear dosing pump is preferred. If desired, the aqueous alkali may be heated above ambient temperature prior to introduction.

Although various sparging or like devices may be employed at the point of introduction to create turbulence of the alkali to effect a mixing action with the flow of the liquid, as is apparent, the larger the piping and amount of flow, the less efficient such mixing will be. Most practically and efficiently, therefore, the mixing of the alkali and liquid is accomplished by an in-line mixing device such as a static mixer, known to those skilled in the art, to achieve a uniform dispersion of the alkali in the liquid.

The pH-increased liquid contained in the piping system then is heated to a temperature of from about 100° C. to about 170° C. such as by means of at least one in-line heat exchanger, as is well known to those skilled in the art, or by introduction of steam into the flow of the pH-increased liquid, or by a combination of steam introduction and at least one in-line heat exchanger.

In accordance with the present invention, upon addition of alkali to the liquid, the chlorohydrin reduction reaction is initiated, and upon application of heat, the reaction rate is advanced. Generally, when greater amounts of alkali are added, because the concentration ratio of OH$^-$ to the chlorohydrin content is greater, the reaction will proceed faster and produce a greater reduction in the quantity of the chlorohydrins in a lesser time. In addition, generally, at any particular increased pH, as the treatment temperature is increased, the time necessary for reduction of the amount of chlorohydrins will decrease. As a practical matter, therefore, the actual processing time and the temperature at any given pH is dictated by the quantity of alkali employed, by the quantity of undesired chlorohydrins present in the hydrolysed product and the overall desired organoleptic properties of the hydrolysed protein.

The time required for obtaining any particular desired reduction of the amount of chlorohydrins is accommodated by the holding piping section means which is provided with insulation and/or heating elements to maintain the temperature of the flow of the heated pH-increased liquid through it at a desired reaction temperature in the range of about 100° C. to 170° C. As noted above, and as will be appreciated by one of ordinary skill, the residence, or dwell, time in the holding piping section is dependent upon the holding pipe volume, i.e., length times cross-sectional area, and the rate of flow of the heated liquid, and thus, the residence, or dwell, time may be adjusted by adjusting any of those three variables.

The holding piping section desirably is embodied to carry the flow of the liquid for a period of from about 5 seconds to about 20 minutes, preferably from about 30 seconds to about 10 minutes and more preferably from about 1 minute to about 10 minutes, and most preferably from about 3 minutes to about 5 minutes, although employment of longer holding times is not precluded in the practice of the present invention.

In one embodiment of the present invention, the chlorohydrin-reduced heated liquid under pressure is directed from the holding piping section means to means positioned in the system piping means for cooling the liquid such as at least one in-line heat exchanger, and it has been discovered that cooling the liquid under pressure is a result-effective variable which enables suppression of ammonia gas and substantial avoidance of ammonia gas evolution from the liquid. Thus, the cooling in this and other embodiments is employed so that the cooling is sufficient to effect that result.

After cooling the heated liquid to a temperature such as below 100° C. and preferably to about 45° C. to about 60° C., the pressure may be released and the cooled product collected. The cooled and/or collected product may be acidified subsequently with aqueous hydrochloric acid which, preferably, is as concentrated as possible, i.e., 32% by weight, and then equilibrated.

Alternatively, after cooling, the cooled liquid is maintained under pressure in the system piping means and directed to a point whereat hydrochloric acid is introduced and mixed into the flow of cooled liquid to adjust the pH of the liquid which is also beneficial, in combination with cooling the liquid under pressure, to enable suppression of ammonia gas and substantial avoidance of evolution of ammonia gas from the liquid.

As with the introduction of the alkali into the system piping means, centrifugal, gear dosing or volumetric, or membrane dosing pumps may be employed for the introduction of the hydrochloric acid, and the hydrochloric acid may be sparged to assist in mixing. Again, however, mixing is most advantageously effected by an in-line mixer such as with a static mixer. A membrane dosing pump is preferred.

The pH-adjusted liquid which is under pressure then is directed downstream in the system piping means and the pressure is released. If desired, since the addition of the hydrochloric acid results in an exothermic reaction, further cooling may be effected prior to pressure release, or the pH adjusted liquid may be flash-cooled to cool it and release pressure. The cooled pH-adjusted hydrolysate may then be equilibrated and or further processed, as desired.

As a further alternative embodiment, after the chlorohydrin-reduced heated liquid hydrolysate is delivered from the holding piping section means into the downstream portion of the system piping means, hydrochloric acid is introduced into and mixed with the heated liquid to adjust the pH as described above. It has been found that the introduction of the hydrochloric acid in this manner also is result-effective to enable suppression of ammonia gas and substantial avoidance of ammonia gas evolution from the liquid. The pH-adjusted liquid then is cooled such as by a heat exchanger and the pressure released, or most preferably, the pH-adjusted liquid is flash-cooled. As with the other embodiments described above, the cooled liquid may then be equilibrated prior to further processing or use.

As will be appreciated, when alkali is added to the liquid, just as when hydrochloric acid is added to the chlorohydrin-reduced liquid, as noted above, the temperature of the liquid will increase since the resultant reactions are exothermic. The temperature of the liquid has been found to rise on the order of from, generally, about 5° C. to about 15° C. when the alkali or hydrochloric acid is added.

In the context of the present invention, "flash-cooled" and "flash-cooling", also known as "evaporative cooling", means cooling which occurs with the reduction of pressure upon a liquid below a correlated equilibrium temperature which, in this case, results in evaporation of water from the liquid hydrolysed protein. Flash-cooling thereby provides for removal of at least some of the additional water added by reason of the addition of alkali and hydrochloric acid to the hydrolysed proteins and thereby effects at least some concentration of the hydrolysate.

Devices employed for flash-cooling may include various devices familiar to those skilled in the art, with vacuum flash-cooling devices being preferred.

Additionally, flash-cooling advantageously enables employment of direct injection of steam for heating the pH-increased hydrolysate since it has been found that, generally, at least the amount of moisture added by steam injection may be removed by the flash-cooling. Steam injection has been found to be a particularly efficient means of heating and is advantageously employed in combination with flash-cooling to treat unfiltered hydrolysate which provides that even unhydrolysed residual material also will have a reduced chlorohydrin content.

Additionally, the apparatus system may include a recycle feature to assist advancing the system to a steady state, and/or to enable treating at least a portion of the hydrolysate more than once. The above-referred to equilibration may include a system which includes means not only to buffer the product but means for separating any residual gases produced during the reaction, including any residual ammonia gas, from the product.

As will be apparent, the use of maximum concentration of acid and alkali reduces the amount of water which must be removed from the final chlorohydrin content reduced product. Additionally, control of the quantities of alkali and hydrochloric acid added may be effected by quantity ratio control or by control as determined by the pH of the liquid.

Materials employed for construction of the piping system and associated equipment are advisedly resistant to corrosion at the acidic and alkaline pH's employed and may include stainless steel and appropriate plastics known to those skilled in the art. All equipment also is constructed and embodied to withstand and control the temperatures and pressures employed.

In practicing the chlorohydrin reduction reaction, the pH of the liquid containing the hydrolysed protein may be increased with the alkali to a pH of from between about 5 and about 8. Generally, when a chlorohydrin reduction reaction pH of from between about 5 and 8 is employed the other variables of the process such as temperature and holding time generally, because of the amount of chlorohydrin usually contained in the hydrolysed protein, desirably are increased and/or recycling is advantageously employed.

Additionally, since it is believed that the chlorohydrin reduction reaction is a nucleophilic substitution reaction, the amount of chlorohydrin reduction will be related directly to the amount of alkali employed. Thus, for efficiency, it is desirable to employ alkali sufficient to increase the pH of the liquid to a pH of about above 8.

Preferably, the pH of the liquid containing the hydrolysate is increased to a pH of from about 9 to about 11 and most preferably, to a pH of from about 9 to 10.

The temperature employed to advance the chlorohydrin reduction reaction is preferably a temperature in the range of from 110° C. to 150° C. and more preferably from about 115° C. to about 125° C.

Further, as will be appreciated by one of ordinary skill, flow rates will be dependent primarily upon pumping pressure. Piping sizes should be consistent with desired flow rates and the capacities of the various associated pumping means and heating and cooling means. Generally, the flow rate of the heated liquid through the holding piping section should be at least sufficient to avoid fouling, and flow rates may range from about 0.5 m/sec to about 2 m/sec.

Because of salt formation by reason of the pH adjustments, if desired, salts advantageously may be removed by methods such as partial evaporative concentration followed by partial precipitation.

The various features of, particularly, the apparatus system of the present inventions are described with more particularity with reference to the following drawings.

DETAILED DESCRIPTION OF THE DRAWINGS

Figure 1:
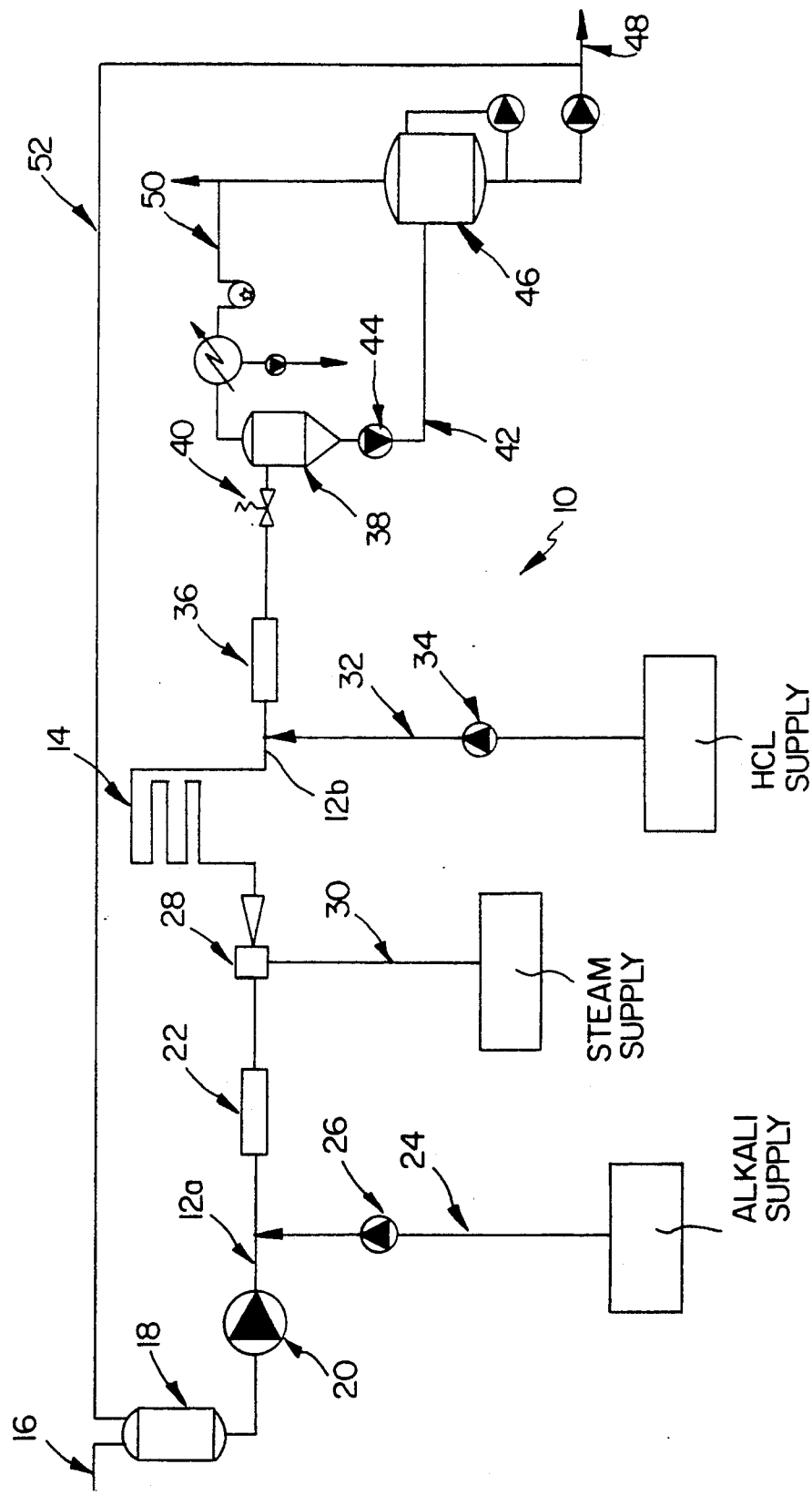
FIG. 1 is a schematic view of a combination of apparatus system elements which may be employed to carry out the reaction for reduction of chlorohydrin content of liquid containing hydrolysed protein.
Figure 2:
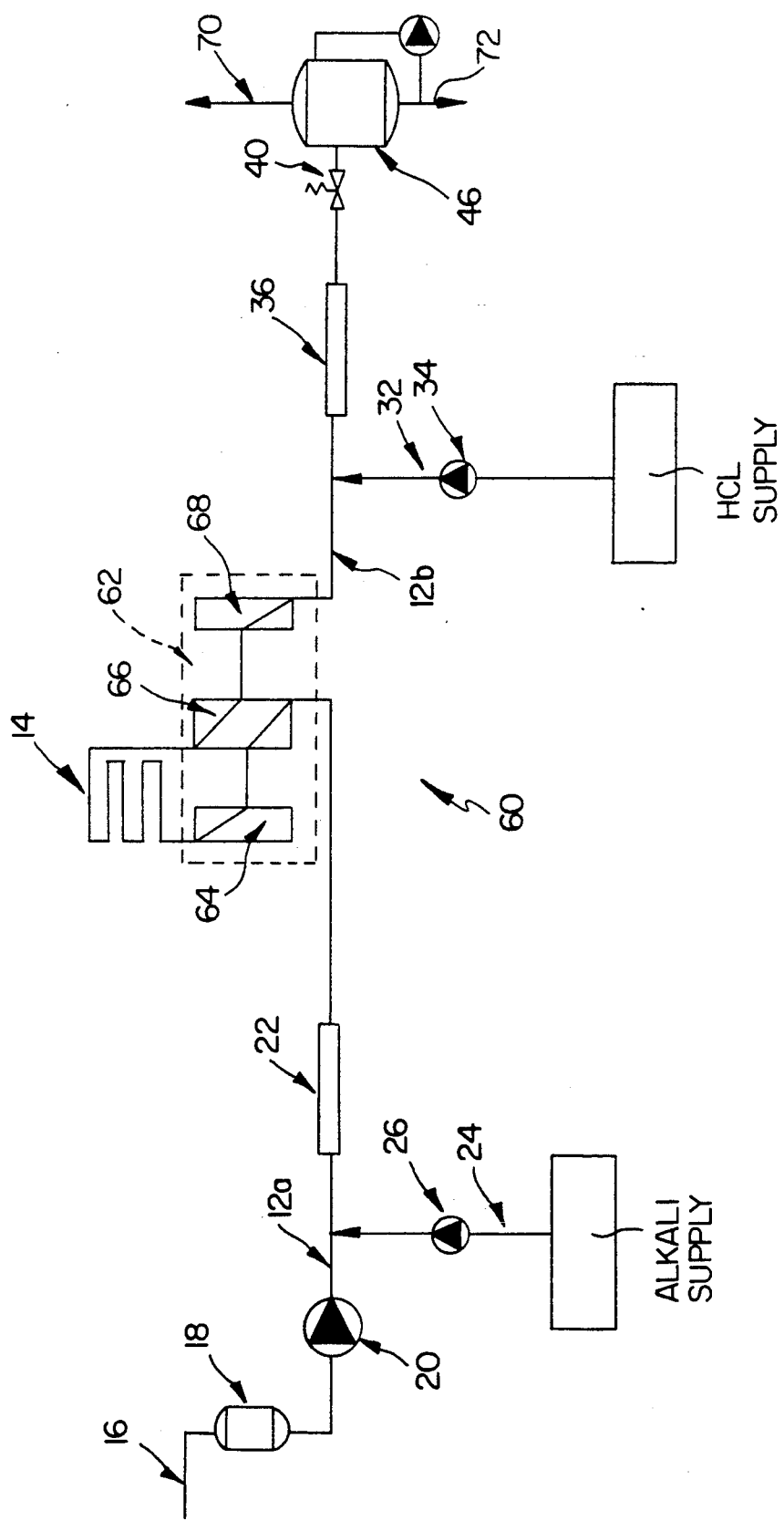
FIG. 2 is a schematic view of an alternative combination of apparatus system elements to carry out the chlorohydrin reduction process.

A combination of apparatus system elements which may be employed to effect the chlorohydrin reduction reaction is generally designated by reference numeral 10 in FIG. 1 and by reference numeral 60 in FIG. 2. Like elements in FIGS. 1 and 2 are designated with like reference numerals. System piping means 12, designated as 12a and 12b for the upstream and downstream portions, respectively, thereof, contains and directs the flow of the liquid to all other elements of the combination of apparati 10 and 60 and includes holding piping section means 14.

With reference to FIG. 1, liquid containing hydrolysed protein is fed via line 16 to feed supply tank 18. The liquid is directed from tank 18 to upstream piping system means 12a which includes means, such as pump 20, to place the liquid under pressure. The flow of pressurized liquid then is directed to mixer means 22, which may be an in-line static mixer. Prior to mixer 22, a feed line 24, which is connected to a supply of aqueous alkali, intersects piping 12a to enable introduction of alkali into the flow of liquid in upstream piping 12a. Pump means 26 is connected to alkali feed line 24 to pressurize the alkali.

Means 28 for heating the flow of liquid directed from mixer 22 is next provided in piping 12a. As illustrated, heating means 28 is embodied to introduce a supply of steam from a steam supply via line 30, although at least one heat exchanger, as known in the art, could be employed in lieu of or in combination with steam for heating.

Positioned downstream of heating means 28 and intermediate to upstream system piping means 12a and downstream system piping means 12b is holding piping section means 14 which, as described above, has a volume sufficient, with respect to a rate of flow of the heated liquid, to hold the heated liquid for a time sufficient at a temperature of from about 100° C. to about 170° C. to enable the reaction which reduces the chlorohydrin content of the hydrolysed proteins to proceed. As indicated above, holding piping section means 14 includes means for controlling temperature and thus includes means such as heating elements and/or insulation.

Positioned downstream of holding piping section means 14 and connected to system piping means 12b is line 32 which is connected to a supply of hydrochloric acid to enable introduction of hydrochloric acid into the flow of heated liquid. Line 32 includes pump means 34 for delivery of the acid to the flow of heated liquid under pressure into piping 12b.

Mixer means 36, which may be an in-line static mixer, is positioned in piping 12b downstream of the connection between piping 12b and line 32.

The flow of heated liquid is directed from mixer means 36 to means 38 embodied for cooling the liquid, which in the combination of FIG. 1, preferably is a flash-cooling means, although other alternative cooling means such as at least one heat exchanger may be employed. Back pressure valve 40 is advisedly positioned in piping 12b between mixer 36 and flash-cooling means 38 to assist in pressure control of the apparatus system.

Preferably, as illustrated in FIG. 1, after cooling, the chlorohydrin-reduced hydrolysate is directed from cooling means 38 via line 42 containing pump means 44 to means 46 embodied for equilibrating the hydrolysate which may include buffering means, the equilibrated product being delivered out of means 46 via line 48. Condensate from the equilibration treatment may be directed via line 50 to cooling means 38, and if desired, treated equilibrated product may be recycled by directing it from means 46 to tank 18 via line 52 for further treatment.

In the alternative embodiment of FIG. 2, the apparatus system elements, generally designated 60, from feed tank 18 through and including mixer 22 are the same as those depicted in FIG. 1. However, a different combination of heating means and cooling means are employed which is a system of heat exchangers generally designated 62 which, as illustrated, comprise three heat exchangers 64, 66 and 68.

Heat exchanger 66 is employed for both heating and cooling the liquid, heat exchanger 64 is employed only for heating, and heat exchanger 68 is employed only for cooling. Thus, piping 12a is connected to heat exchanger 66 and directs the flow of liquid downstream to that heat exchanger and then on to heat exchanger 64 which is connected to holding piping section means 14 which is, in turn, connected to heat exchanger 66 which, in turn, is connected to cooling heat exchanger 68 by piping 12b.

The heat exchanger cooled liquid then is directed via piping 12b to a connection between piping 12b and line 32 which is connected to a supply of hydrochloric acid and includes pump 34 as in FIG. 1. Mixer 36 is positioned in piping 12b downstream of the connection between piping 12b and line 32.

The flow of cooled liquid then is directed from mixer 36 in piping 12b under pressure to preferably means 46 for equilibrating the cooled hydrolysate via, preferably, back-pressure valve 40, and pressure is relieved, and means 46 may be ventilated via line 70. Product may be collected via line 72.

EXAMPLES

The following Examples further illustrate the present invention wherein parts and percentages are by weight unless otherwise indicated.

EXAMPLE I

About 100 kg of corn gluten containing about 60% protein is hydrolysed with about 180 kg of about 20% hydrochloric acid at about 120° C. for about 7 hours which provides a hydrolysed plant protein ("HPP") feed seasoning.

The HPP has a chlorohydrin content of from about 150 ppm to about 300 ppm, and the chlorohydrin content is reduced in an apparatus as shown in FIG. 1.

The HPP is continuously fed under pressure through the system. Sodium hydroxide (NaOH 50%) is fed into the flow of HPP in an amount such that the pH of the HPP is increased to a pH of about 9.

The flow of the pH-increased HPP is heated by steam injection to about 120° C. and passed to the holding piping section means which is insulated and which holds the flowing HPP at about 120° C. for a residence time of about 5 minutes.

After the flow departs the holding piping section means, hydrochloric acid (HCL 32%) is introduced and mixed into the heated HPP to acidify the HPP and adjust its pH to a pH of about 5.1.

The acidified HPP is cooled by vacuum flash cooling means to about 50° C. at about 125 mbar vacuum.

The HPP is equilibrated for about 15 minutes in an equilibration vessel which includes a re-circulation means.

The final product has a chlorohydrin content of below 1 ppm.

EXAMPLE 2

About 100 kg of corn gluten containing about 60% protein is hydrolysed with about 180 kg of about 18% hydrochloric acid at about 120° C. for about 7 hours which provides a hydrolysed plant protein ("HPP") feed seasoning, which is processed in apparatus as illustrated in FIG. 2. The HPP has a chlorohydrin content of from about 50 ppm to about 150 ppm.

The HPP is alkalized to obtain a pH of about 9.5 and then is heated in the heat exchangers to about 120° C. and flowed through the holding piping section means, which is insulated, for about 5 min. The HPP then is cooled to about 50° C. in the heat exchangers.

The flow of cooled HPP is acidified by mixing it with hydrochloric acid (HCl 32%) with an in-line static mixer to acidify it and adjust its pH to a pH of about 5.2.

The final product has a chlorohydrin content of below 100 ppb.

As will be appreciated, various modifications of the foregoing invention may be made without departing from the spirit and scope of the following claims and may be practiced suitably in the absence of elements not specifically disclosed herein.

We claim:

1. A process for reducing chlorohydrin content of hydrolysed protein comprising:
   passing a flow of liquid, wherein the liquid comprises hydrolysed protein obtained by hydrolysis of protein with hydrochloric acid, under a pressure greater than atmospheric pressure through a system piping means for containing the flowing pressurized liquid;

introducing a quantity of alkali into the flowing pressurized liquid and mixing the alkali and liquid to increase the pH of the liquid and obtain a flowing pressurized pH-increased liquid;

heating the flowing pressurized pH-increased liquid to a temperature of from about 100° C. to 170° C.;

maintaining the temperature of the heated flowing pressurized pH-increased liquid at the temperature of from about 100° C. to 170° C. for a time sufficient for reducing the chlorohydrin content of hydrolysed protein contained in the pH-increased liquid to obtain a flowing pressurized chlorohydrin-reduced liquid; and cooling the flowing pressurized chlorohydrin-reduced liquid to a temperature below 100° C. so that cooling is sufficient to suppress and substantially avoid ammonia gas evolution form the cooled liquid; and releasing the pressure form the piping system means and the cooled liquid; and collecting the liquid from which the pressure has been released.

2. A process according to claim 1 further comprising introducing hydrochloric acid into the flowing pressurized cooled liquid prior to releasing the pressure to provide a pH-adjusted liquid and then releasing the pressure.

3. A process according to claim 1 wherein before cooling the flowing liquid, further comprising introducing and mixing a quantity of hydrochloric acid into the flowing pressurized chlorohydrin-reduced liquid to provide a pH-adjusted chlorohydrin-reduced liquid and then cooling the flowing pressurized pH-adjusted chlorohydrin-reduced liquid and releasing the pressure.

4. A process according to claim 3 wherein the pH-adjusted liquid is cooled and the pressure is released by flash-cooling.

5. A process according to claim 1 or 4 wherein the flowing pressurized pH-increased liquid is heated to and maintained at a temperature of from 110° C. to 150° C. and wherein the chlorohydrin-reduced liquid is cooled to a temperature of from about 45° C. to about 60° C.

6. A process according to claim 1 or 4 wherein the temperature of the heated flowing pressurized liquid is maintained for a period of from about 5 seconds to about 20 minutes.

7. A process according to claim 1 wherein the pH of the flowing pressurized liquid is increased to a pH of from between about 5 and about 8.

8. A process according to claim 1 wherein the pH of the flowing pressurized liquid is increased to a pH of from about 8 to about 14.

9. A process according to claim 1 or 2 or 3 or 4 wherein the pH of the flowing pressurized liquid is increased to a pH of from about 9 to about 11 and the temperature of the heated flowing pressurized liquid is maintained for from about 1 minute to about 10 minutes.

10. A process according to claim 1 wherein the chlorohydrin-reduced liquid is cooled to a temperature of from about 45° C. to about 60° C.

11. A process according to claim 1 wherein the pH of the flowing pressurized liquid is increased to a pH of from about 9 to 11, wherein the temperature of the heated flowing pressurized liquid is maintained for from about 1 minute to about 10 minutes and wherein the chlorohydrin-reduced liquid is cooled to a temperature of from about 45° C. to about 60° C.

12. A process according to claim 2 or 3 or 4 wherein the pH of the flowing pressurized liquid is increased to a pH of from about 9 to 11, wherein the temperature of the heated flowing pressurized liquid is maintained from about 1 minute to about 10 minutes and wherein the pH-adjusted liquid is cooled to a temperature of from about 45° C. to about 60° C.

* * * * *

UNITED STATES PATENT AND TRADEMARK OFFICE
CERTIFICATE OF CORRECTION

PATENT NO. : 5,151,503
DATED : September 29, 1992
INVENTOR(S) : Roland FÄSI, et al.

It is certified that error appears in the above-identified patent and that said Letters Patent is hereby corrected as shown below:

Column 10, line 65, after "of" insert --a--.

Column 11, between numbered lines 21 and 25 "form" should be --from--.

Column 11, in the line immediately above numbered line 25 "form" should be --from--.

Column 12, line 37, "from" should be --for--.

Signed and Sealed this

Fourteenth Day of September, 1993

Attest:

BRUCE LEHMAN

Attesting Officer

Commissioner of Patents and Trademarks